(12) United States Patent
Lucas et al.

(10) Patent No.: US 10,402,800 B2
(45) Date of Patent: *Sep. 3, 2019

(54) IMAGE AUTHENTICATION AND SECURITY SYSTEM AND METHOD

(71) Applicant: JPMorgan Chase Bank, N.A., New York, NY (US)

(72) Inventors: Brad X. Lucas, Montara, CA (US); John Hsieh, Foster City, CA (US); Ravi Acharya, Philadelphia, PA (US); Sih Lee, Northvale, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 492 days.

This patent is subject to a terminal disclaimer.

(21) Appl. No.: 13/867,249

(22) Filed: Apr. 22, 2013

(65) Prior Publication Data

US 2013/0246264 A1 Sep. 19, 2013

Related U.S. Application Data

(62) Division of application No. 12/904,203, filed on Oct. 14, 2010, now Pat. No. 8,494,961.

(51) Int. Cl.
*G06Q 40/02* (2012.01)
*G06Q 20/10* (2012.01)
(Continued)

(52) U.S. Cl.
CPC ... *G06Q 20/1085* (2013.01); *G06Q 20/40145* (2013.01); *G06Q 40/02* (2013.01); *G07F 19/207* (2013.01)

(58) Field of Classification Search
CPC .............................................. G06Q 40/00–08
(Continued)

(56) References Cited

U.S. PATENT DOCUMENTS

| 4,860,352 A | 8/1989 | Laurance et al. |
| 7,374,079 B2 | 5/2008 | Nam et al. |

(Continued)

FOREIGN PATENT DOCUMENTS

WO WO-2011014875 A1 2/2011

OTHER PUBLICATIONS

Peter, K. John, et al. 2011 IEEE Electronics Computer Technology (ICECT), 2011 3rd International Conference article, "Improving ATM Security via Face Recognition".

(Continued)

*Primary Examiner* — Narayanswamy Subramanian
(74) *Attorney, Agent, or Firm* — Greenblum & Bernstein, P.L.C.

(57) ABSTRACT

Embodiments of the invention are related to a computer-implemented authentication method and system for authenticating a customer using an electronic device for engaging in a transaction involving a financial institution over a network. Embodiments of the method include capturing an image of the customer engaging in the transaction using an image capturing device integrated with the electronic device and retrieving a stored image of the customer from an authentication database. Embodiments of the invention additionally include comparing, using a comparison algorithm executed by computer processing components, the stored image with the captured image to authenticate the customer and upon authentication, monitoring the captured image during the transaction for an interruption using the computer processing components. The method further includes terminating the transaction if an interruption is detected.

15 Claims, 7 Drawing Sheets

(51) Int. Cl.
*G07F 19/00* (2006.01)
*G06Q 20/40* (2012.01)

(58) Field of Classification Search
USPC .................................................. 705/35–45
See application file for complete search history.

(56) References Cited

U.S. PATENT DOCUMENTS

| | | | |
|---|---|---|---|
| 7,389,914 B1 | 6/2008 | Enright et al. | |
| 7,494,067 B1 | 2/2009 | Zhu | |
| 7,505,056 B2 | 3/2009 | Kurzweil et al. | |
| 7,516,888 B1 | 4/2009 | Kundu et al. | |
| 7,533,805 B1 | 5/2009 | Enright et al. | |
| 7,533,806 B1* | 5/2009 | Enright | G06Q 20/10 235/379 |
| 7,595,816 B1 | 9/2009 | Enright et al. | |
| 7,766,223 B1 | 8/2010 | Mello et al. | |
| 7,789,299 B1 | 9/2010 | Ramachandran et al. | |
| 7,797,237 B2 | 9/2010 | Kim | |
| 7,797,243 B2 | 9/2010 | Stadelmann et al. | |
| 7,832,629 B1 | 11/2010 | Ramachandran et al. | |
| 7,850,073 B1* | 12/2010 | Ramachandran | G06Q 20/18 235/379 |
| 7,861,922 B2 | 1/2011 | Lee et al. | |
| 7,900,823 B1 | 3/2011 | Knouff et al. | |
| 7,909,243 B2 | 3/2011 | Merkow et al. | |
| 7,950,573 B1 | 5/2011 | Enright et al. | |
| 7,950,574 B1* | 5/2011 | Ramachandran et al. .... 235/379 | |
| 8,028,896 B2* | 10/2011 | Carter | G06Q 10/0633 235/379 |
| 8,104,680 B2* | 1/2012 | Kundu | G06Q 20/00 235/375 |
| 8,145,562 B2* | 3/2012 | Wasserblat | G06Q 10/10 705/38 |
| 8,155,394 B2 | 4/2012 | Allegra et al. | |
| 8,181,858 B2 | 5/2012 | Carter et al. | |
| 8,370,262 B2* | 2/2013 | Blessing | 705/64 |
| 8,396,808 B2 | 3/2013 | Greenspan | |
| 8,494,961 B1* | 7/2013 | Lucas | G06Q 20/1085 705/35 |
| 8,943,548 B2* | 1/2015 | Drokov | G06Q 20/32 726/2 |
| 9,019,066 B2* | 4/2015 | Black | G06Q 20/40145 235/379 |
| 9,313,200 B2* | 4/2016 | Hoyos | H04L 63/0861 |
| 9,704,020 B2* | 7/2017 | Koul | G06K 9/00 |
| 10,165,307 B2* | 12/2018 | Koul | G06K 9/00 |
| 2002/0112177 A1 | 8/2002 | Voltmer et al. | |
| 2003/0028784 A1 | 2/2003 | Uchida | |
| 2004/0024709 A1* | 2/2004 | Yu | G06Q 20/105 705/43 |
| 2004/0111324 A1 | 6/2004 | Kim | |
| 2004/0199469 A1* | 10/2004 | Barillova | G06Q 20/04 705/44 |
| 2005/0224573 A1* | 10/2005 | Yoshizane | G06F 21/32 235/379 |
| 2007/0057049 A9 | 3/2007 | Kundu et al. | |
| 2008/0046366 A1 | 2/2008 | Bemmel et al. | |
| 2008/0149725 A1 | 6/2008 | Rosenbaum | |
| 2008/0177662 A1* | 7/2008 | Smith | G06Q 20/24 705/44 |
| 2008/0307515 A1* | 12/2008 | Drokov | G06Q 20/32 726/7 |
| 2009/0076924 A1* | 3/2009 | Dina | G06Q 20/18 705/24 |
| 2009/0138366 A1 | 5/2009 | Bemmel et al. | |
| 2009/0146845 A1 | 6/2009 | Hedley | |
| 2009/0160975 A1 | 6/2009 | Kwan | |
| 2009/0201372 A1* | 8/2009 | O'Doherty et al. ......... 348/150 | |
| 2010/0059587 A1 | 3/2010 | Miller et al. | |
| 2010/0111377 A1* | 5/2010 | Monroe | G06K 9/00221 382/118 |
| 2010/0161468 A1* | 6/2010 | Hickman | G06F 21/445 705/35 |
| 2010/0290592 A1 | 11/2010 | Yamada | |
| 2011/0063108 A1* | 3/2011 | Aonuma | G06Q 20/4016 340/540 |
| 2011/0251892 A1* | 10/2011 | Laracey | G06Q 30/0253 705/14.51 |
| 2011/0276484 A1* | 11/2011 | Pearson | G06Q 20/38 705/44 |
| 2012/0030107 A1* | 2/2012 | Gibson | G06Q 20/10 705/43 |
| 2012/0084206 A1* | 4/2012 | Mehew | G06Q 40/00 705/44 |
| 2012/0089461 A1 | 4/2012 | Greenspan | |
| 2012/0330769 A1 | 12/2012 | Arceo | |
| 2013/0246264 A1* | 9/2013 | Lucas | G06Q 20/1085 705/43 |
| 2016/0182505 A1* | 6/2016 | Hoyos | H04L 63/0861 726/4 |

OTHER PUBLICATIONS

Pravinthraja, S. and Umamaheswari, K. Dec. 2011 Bonfring International Journal of Advances in Image Processing article, "Multimodal Biometrics for Improving Automatic Teller Machine Security".

* cited by examiner

IMAGE AUTHENTICATION AND SECURITY SYSTEM AND METHOD

RELATED APPLICATIONS

This application is a divisional application of U.S. patent application Ser. No. 12/904,203, filed on Oct. 14, 2010.

TECHNICAL FIELD

Embodiments of the invention are related generally to systems and methods for authentication of individuals engaging in financial transactions, and in particular to remote electronic financial transactions.

BACKGROUND OF THE INVENTION

Various authentication methods exist in order to authenticate users accessing financial accounts from electronic devices. For example, when accessing an account from an ATM machine, users are typically required to provide a physical card and a personal identification number (PIN). When accessing financial accounts using electronic devices such as laptop computers and cellular phones, users are typically provided with an interface that requires a user ID and password, and often an additional layer of security, such as answers to security questions.

Currently existing authentication methods often have a negative effect on the remote user experience and make it difficult to navigate remotely through banking processes. With respect to ATMs, on most modern ATMs, the customer is identified after inserting a plastic ATM card with a magnetic stripe or a plastic smart card with a chip, that contains a unique card number and some security information such as an expiration date and CVV code. Authentication is typically provided by the customer entering a PIN. However, other authentication techniques may be implemented. Using an ATM, customers can access their bank accounts in order to make deposits of cash or checks, make cash withdrawals, obtain credit card cash advances, and check their account balances as well as other functions.

Although automated teller machines (ATMs) have evolved, the authentication methods required to allow access to accounts have not similarly evolved. For example, while in previous decades, ATMs retained an inserted bank card through the duration of a transaction, currently existing ATMs merely require customers to swipe or dip the card to be read. Thus, at the end of a transaction, the customer is typically prompted for further action during an authentication session. Since the customer has already reclaimed his ATM card and has completed the transaction, the customer might vacate the ATM prior to termination of authentication, thus leaving the authenticated session open for potential fraudulent use.

With respect to remote electronic devices, various electronic devices have been developed that include cameras facing the user of the device. Thus, while the user is implementing the device for remote banking purposes, an image of the user may be captured. The image of the user may be a snapshot or a streaming or video image of the user. Such remote electronic devices may include, for example, a cellular phone, laptop, smart phone, tablet, PDA, or a television or equipment connected to a television. Other electronic devices may also be implemented.

Accordingly, solutions are needed for identifying and authenticating users that utilize the evolving capabilities of ATMs and other electronic devices such as those described above. A solution is needed for providing techniques that are impossible to circumvent, yet provide seamless user experience. If this can be accomplished, both customers and financial institutions will benefit from a decrease in fraudulent transactions.

SUMMARY OF PREFERRED EMBODIMENTS

Embodiments of the present invention are directed to a computer-implemented authentication method for authenticating a customer using an electronic device for engaging in a transaction involving a financial institution over a network. The method may include capturing an image of the customer engaging in the transaction using an image capturing device integrated with the electronic device, retrieving a stored image of the customer from an authentication database, and comparing, using a comparison algorithm executed by computer processing components, the stored image with the captured image to authenticate the customer. Additionally, upon authentication, the method may include monitoring the captured image during the transaction for an interruption using the computer processing components and terminating the transaction if an interruption is detected.

In an additional aspect of the invention, a computer-implemented authentication method is provided for authenticating a customer using an electronic device for engaging in a transaction over a network involving a financial institution. The method includes capturing a video image of a face of the customer engaging in the transaction using an image capturing device integrated with the electronic device. The method further includes retrieving stored facial patterns related to the customer from an authentication database and comparing, using a comparison algorithm executed by computer processing components, the stored facial patterns with facial patterns present in the captured video image to authenticate the customer. The method may additionally include scoring a degree of correspondence based upon the comparison, determining a transaction type requested by the customer and approving the transaction for processing if the degree of correspondence is sufficient for the requested transaction type.

In a further aspect of the invention, a computer-implemented authentication system is provided for authenticating a customer using an electronic device for engaging in a transaction with a financial institution over a network. The system may include an application, executed by computer processing components of the remote electronic device, the application including an actuator for triggering image capture of the customer engaging in the transaction using an image capturing device integrated with the electronic device and an authentication database including a stored image of the customer. The system may additionally include facial recognition and comparison components for comparing, using a comparison algorithm executed by computer processing components, the stored image with the captured image to authenticate the customer.

In an additional aspect of the invention, a computer-implemented authentication method is provided for authenticating a customer using an ATM for engaging in a financial transaction with a financial institution. The method comprises processing an ATM card submitted by the customer to identify a customer account, authenticating the customer submitting the ATM card and continuously capturing an image of the authenticated customer engaging in the financial transaction using an image capturing device operating cooperatively with the ATM. The method may additionally include monitoring the continuously captured image for an interruption during the financial transaction and after completion of the financial transaction and terminating the transaction or requiring additional authentication if an interruption is detected.

DESCRIPTION OF DRAWINGS

Embodiments of the present invention are directed to a system and method for handling authentication of customers performing financial transactions using electronic devices including ATMs or remote electronic devices such as, but not limited to, cellular phones, laptops, smart phones, tablets, or PDAs. Embodiments of the invention incorporate the image capturing capabilities that have become commonplace in such devices to facilitate authentication, discourage hackers, and prevent theft and fraud.

Figure 1:
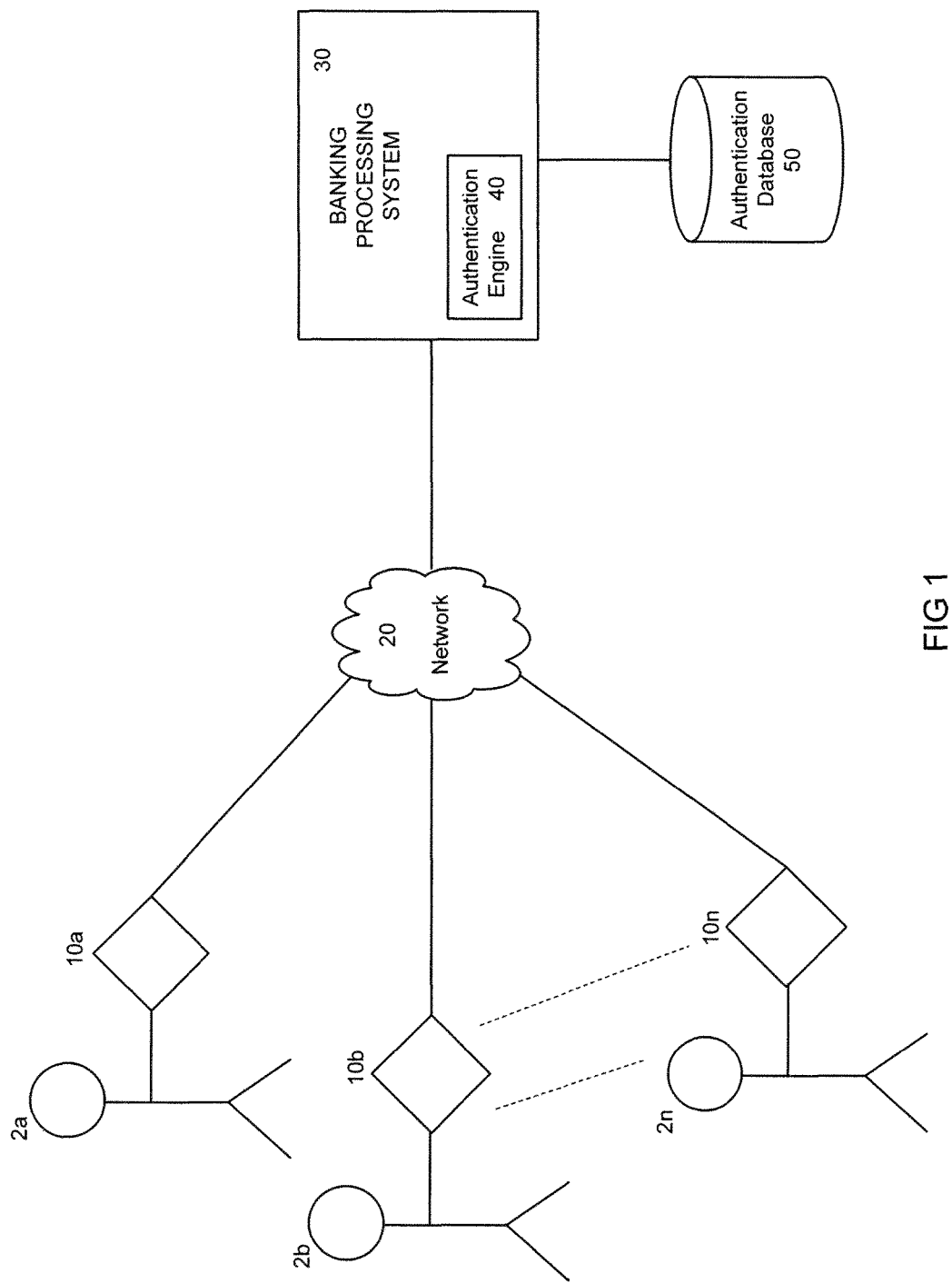
FIG. 1 is a block diagram illustrating an operating environment for an authentication system and method in accordance with an embodiment of the invention.

FIG. 1 is a block diagram illustrating an operating environment for an authentication system and method in accordance with an embodiment of the invention. FIG. 1 illustrates customers 2a, 2b . . . 2n using electronic devices 10a, 10b . . . 10n that access a bank processing system 30 over a network 20. The bank processing system 30 may include an authentication engine 40 that accesses an authentication database 50.

Customers 2a, 2b . . . 2n may be customers of financial institutions that hold one or more of various types of accounts with the financial institution. The accounts may include for example, checking accounts, savings accounts, credit accounts, debit accounts, stored value accounts, investment accounts, and any other types of accounts commonly held at financial institutions.

Electronic devices 10a, 10b . . . 10n may be used by the customers 2a . . . 2n to access the accounts. The electronic devices may include, for example, cellular phones laptops, smart phones, tablets, PDAs, or a television or equipment connected to a television. Other electronic devices may also be implemented. In additional embodiments of the invention, the electronic device may be or include an ATM that allows customers to directly deposit and withdraw funds and perform other transactions pertinent to the customers' accounts. The electronic devices 10a . . . 10n may include a front facing camera and a network connection. Thus, while the customer 2a . . . 2n is using the electronic device to engage in a transaction, the camera or image capturing device is able to capture an image of the customer's face. Using a camera in the authentication and identification processes facilitates a high level of authentication. For example, if a customer is working within a banking application and wants to conduct a high risk transaction, such as wiring millions of dollars, the system will identify and authenticate the customer and ensure that it is the customer in fact who is in possession of the electronic device 10a . . . 10n.

Bank processing system 30 processes transaction requests submitted by customers 2a . . . 2n using electronic devices 10a . . . 10n. The bank processing system 30 is preferably hosted by a server connected over the network 20 with the electronic devices 10a . . . 10n. Thus, the electronic devices 10a . . . 10n may connect over the network 20 to a server hosting the bank processing system 30 for performing identification, authentication, and other functions. The server can receive and process signals from the electronic devices 10a . . . 10n in active or passive manner. For example, in an active manner, a customer picks up an Iphone™ and touches a banking application. The activation of the banking application may trigger image capture. Alternatively, as the customer lifts the electronic device 10a . . . 10n, a phone accelerometer triggers a camera integrated with the electronic device to capture the customer and the customer then becomes integrated in the application.

The authentication engine 40 receives data over the network 20 from the remote electronic devices 10a . . . 10n and processes the data in order to authenticate customer 2a . . . 2n requesting the transaction. Thus, in the displayed embodiment, a facial pattern recognition algorithm may be located on the server hosting the bank processing system 30. In additional embodiments, the facial pattern recognition algorithm may be located at the remote electronic device 10a . . . 10n or at both the remote electronic device and the bank processing system 30.

Authentication database 50 contains authentication data necessary to authenticate each user. In some embodiments, the facial recognition is stored in association with each transaction and is made available as part of the transaction record. The image will be available to the users via printed statement or online statement. In embodiments of the invention, authentication data is stored for all customers of a bank in the authentication database 50. The data may further include facial patterns, retinal images, and physiological information such as for example heart rate, pulse, body temperature, fingerprint, etc. The data in the database 50 may additionally include PIN information, security questions and answers or other data necessary for authentication.

The network 20 is preferably the Internet, but may be or include other types of networks. The network 20 may include a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Figure 2:
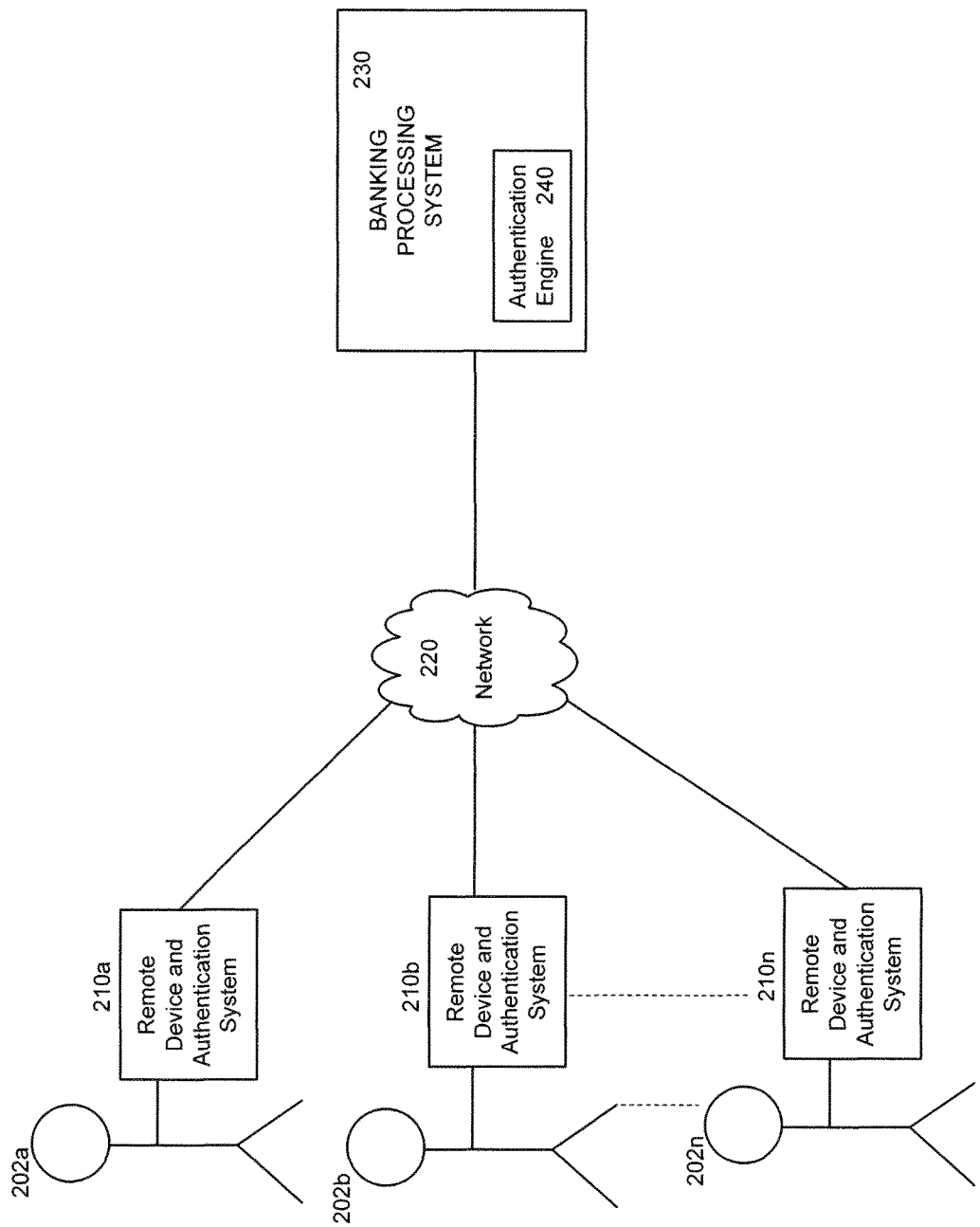
FIG. 2 is a block diagram illustrating components an operating environment for an authentication system and method in accordance with an alternative embodiment of the invention.

FIG. 2 is a block diagram illustrating components of an operating environment for an authentication system and method in accordance with an alternative embodiment of the invention. FIG. 2 illustrates customers 202a, 202b . . . 202n using electronic devices with authentication systems 210a, 210b . . . 210n that access a bank processing system 230 over a network 220. The bank processing system 230 may include an authentication interaction engine 240 that interacts with the authentication system and remote devices 210a . . . n.

Customers 202a, 202b . . . 202n operate substantially as described above with respect to FIG. 1. Likewise, the network 220 may be substantially entirely as described above with respect to the network 20.

Electronic devices with authentication systems 210a, 210b . . . 210n may be equipped with applications for authentication that operate substantially on the electronic devices. However, these applications may interact to the extent necessary with the authentication engine 240 of the bank processing system 230.

Bank processing system 230 may include an authentication interaction engine 240 that interacts with the authentication system and remote device 210. For example, the electronic device authentication system 210 may initiate image capture and analyze the images for correspondence. The results of the analysis may be sent to the authentication engine 240. The authentication engine 240 may determine, based on the customer, the type of transaction, or the amount of the transaction, or a combination of these factors, whether the level of correspondence found through the analysis is sufficient for authentication.

The components of FIGS. 1 and 2 are described in greater detail below with respect to FIGS. 2-5. The components of the electronic device and the bank processing system are shown as separate and distinct, but may, in embodiments of the invention, be integrated into various combinations. The systems operate cooperatively to process data received from the customer in order to facilitate authentication required for processing of transactions.

Figure 3:
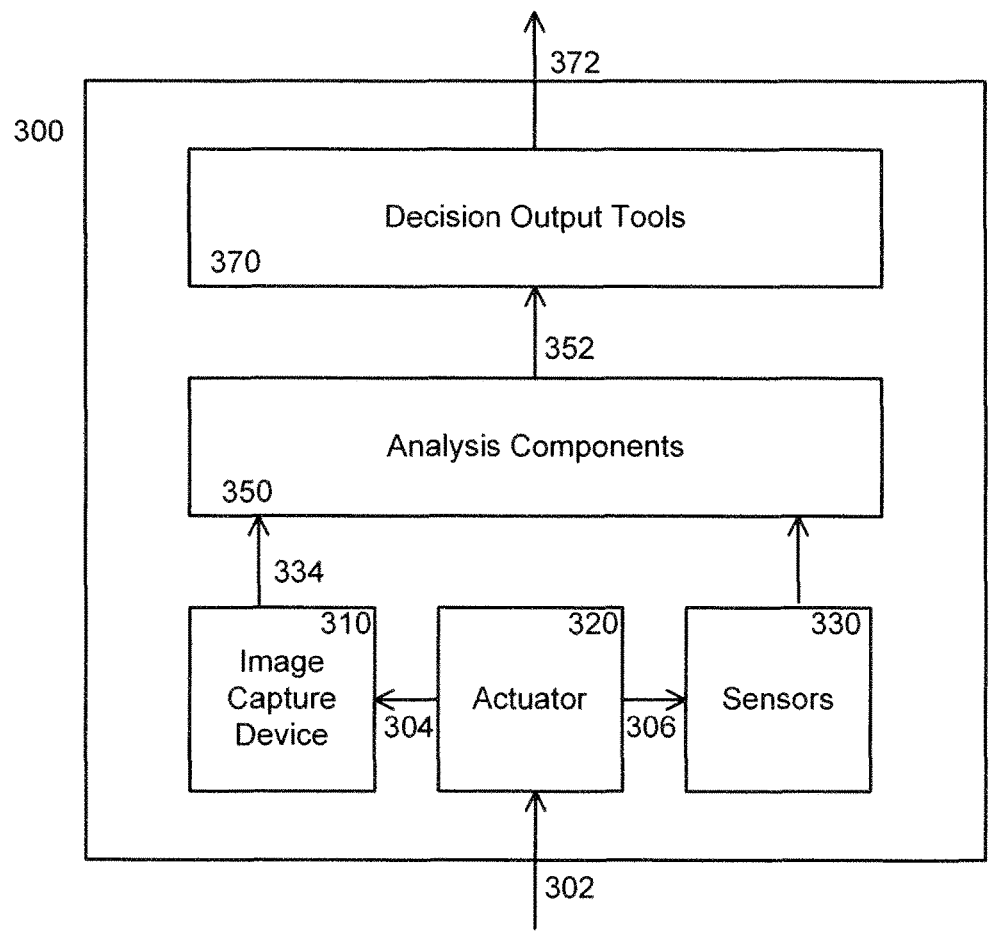
FIG. 3 is a block diagram illustrating components of the authentication system in accordance with an embodiment of the invention.

FIG. 3 is a block diagram illustrating components of an authentication system 300 in accordance with an embodiment of the invention. An actuator 320 receives input 302 and communicates with an image capture device 310 and sensors 330 at 304 and 306 respectively. The image capture device 310 and sensors 330 send data at 332 and 334 to analysis components 350. The analysis components 350 communicate information 352 to decision output tools 370, which ultimately output a decision 372.

The actuator 320 receives input 302 that triggers the authentication process. The actuator 320 may be or include a banking application. Thus, for example, when the customer opens a banking application on an Iphone, the authentication process is triggered or when a customer inserts a card into an ATM, the actuator 320 triggers the authentication process. Thus, the actuator may include software executed by processing components or alternatively may simply include hardware components.

The image capture device 310 is preferably a camera capable of capturing both video and still images. Various electronic devices have been developed that include cameras facing the user of the device. Thus, while the user is implementing the device for remote banking purposes, an image of the user may be captured. The image of the user may be a snapshot or a streaming or video image of the user. Likewise, ATMs are frequently equipped with cameras for security reasons that also may be capable of capturing video and snapshots of the customer facing the camera.

The sensors 330 may function as a secondary authentication device. The sensors 330 may monitor any desired parameter and in particular may detect physiological parameters such as pulse, temperature, blood pressure, fingerprints, voiceprint, etc. The parameters detected by the sensors 330 may be compared to information stored in a database for the particular customer so that the identity of the customer can be verified.

The analysis components 350 analyze information received from the image capture device 310 and the sensors 330. With the use of a moving image, facial movements can be captured and an algorithm may be implemented to match the facial movements with a stored facial pattern in order to effect facial pattern recognition. The analysis components 350 may provide a similar secondary analysis for the parameters detected by the sensors 330. However, in some embodiments of the invention, instead of sensors 330, the keypad of the electronic device may accept another standard method for of secondary authentication such as a PIN entered on a keypad of the electronic device or answers to security questions. The individual authentication methods described above may be scored individually and combined for a total score.

The decision output tools 370 may evaluate the score provided by the analysis components 350 to render an authentication decision at 372. The decision output tools 370 may authenticate a customer for a particular transaction or may decline to authenticate and require additional credentials if the score derived from the analysis components 350 was insufficient for authentication. Required scores or criteria for authentication may depend upon the particular customer, transaction type (funds transfer, withdrawal, deposit, balance check, electronic payment, etc), or transaction amount. Thus, a higher score may be required for a high risk transaction than for a routine transaction.

Figure 4:
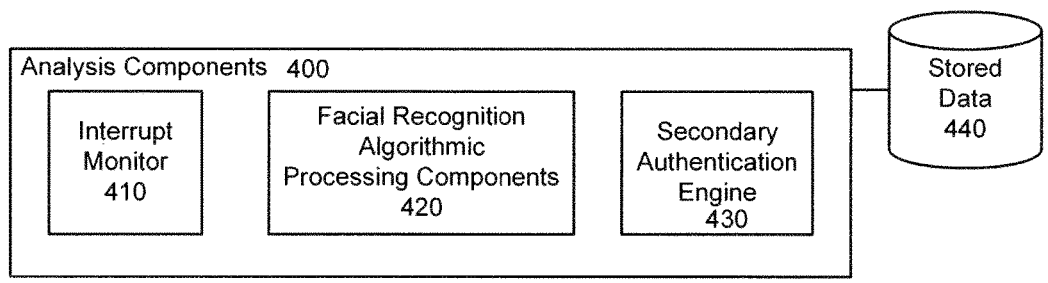
FIG. 4 is block diagram illustrating further details of components of the authentication system in accordance with an embodiment of the invention.

FIG. 4 is block diagram illustrating further details of components of the authentication system in accordance with an embodiment of the invention. FIG. 4 illustrates an embodiment of analysis components 400 including an interrupt monitor 410, facial recognition algorithmic processing components 420, and secondary authentication engine 430. The analysis components 400 may include or access stored data 440.

The interrupt monitor 410 may be equipped to determine whether the image capturing device has captured an image of the same face before, during, and after the transaction. Thus, as set forth above, in accordance with one or more embodiments, a face of an account holder is recognized at an ATM. The face is recognized prior to the proper authentication and is continuously analyzed throughout the transaction. A goal of the recognition is to ensure that the same face is recognized before, during, and after the authentication. For example, if the system detects a change in the user's face after the authentication (e.g. dipping of the ATM card and entering proper PIN), the system will execute actions based on a pre-determined set of rules (e.g. ask for card and PIN again or terminate the transaction). The interrupt monitor 410 may also be implemented with various forms of authentication methods including facial recognition and/or PIN authentication.

The facial recognition algorithmic processing components 420 operate to compare the captured image with a stored image in order to implement facial pattern recognition. The result of the process may include a score rather than a conclusion. The system may further include a mechanism for storing a required score based on a type of transaction and/or a type of account. The algorithm processing components may be or include any known algorithms, such as those implemented by Apple™, which uses facial recognition to tag photos in Iphoto™, or the applications produced by Polar Rose™, such as the augmented reality application called Recognizr™ with the tech Augmented ID, that allows a user to point a handset camera at a friend and see links to his or her social networking profiles and updates. The technology recognizes his or her face and surrounds it with icons linking to relevant information.

The secondary authentication engine 430 may include other authentication features incorporated in the system. For example, the remote electronic device can be motion activated or voice activated. If voice activated, the server or other component of the system may include or access an algorithm for matching the voice with a stored pattern. If the device is motion activated, a thumbprint application may be provided that uses an algorithm for matching the thumbprint of the requestor with a stored thumbprint. Additional or alternative authentication methods can be implemented to supplement the facial recognition. For example, methods such as PIN based authentication tied to soft token or security questions may be implemented by random selection or combination. Furthermore, retinal recognition can be used instead of or in addition to facial recognition. Sensors on the electronic device may also detect thumb prints, finger prints, amount of pressure, pulse, temperature, oxygen level, distance between capillaries, etc. Thus, for example, the sensor may include a pulse oximeter. All of these parameters could be compared to information stored in a database for each customer. In some embodiments, a secondary authentication may include presenting the user with a secret phrase and asking the user to "smile" upon viewing the secret phrase. Smile can be used rather keystroke to prevent potential phishers. To further deter phishing, the screen may not grant access immediately upon detection on the correct phrase (i.e., it will display a few more).

Stored data 440 may include any of the parameters required for authentication pertinent to each customer. Thus, for each customer, a large quantity of identifying data including facial movement patterns, retinal data, fingerprints, blood pressure, temperature, heart rate, etc. may be stored. Furthermore, personal identification numbers, answers to security questions, or other data used for authentication may be stored.

Figure 5:
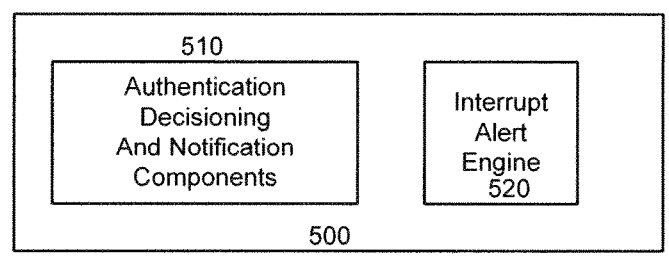
FIG. 5 is a block diagram illustrating further details of components of the authentication system in accordance with an embodiment of the invention.

FIG. 5 is a block diagram illustrating further details of components of the authentication system in accordance with an embodiment of the invention. Specifically, FIG. 5 illustrates decision output tools 500 including authentication decisioning and notification components 510 and an interrupt alert engine 520. The authentication decisioning notification components 510 may make an authentication decision based on the captured data and notify the customer of the decision. The interrupt alert engine 520 may notify the financial institution and the customer when an interrupt in recognition is detected. For example, if the recognized face changes or if the face is no longer present, the interrupt alert engine 520 may ask for further authentication parameters and/or terminate the transaction and notify the financial institution and the customer.

Figure 6:
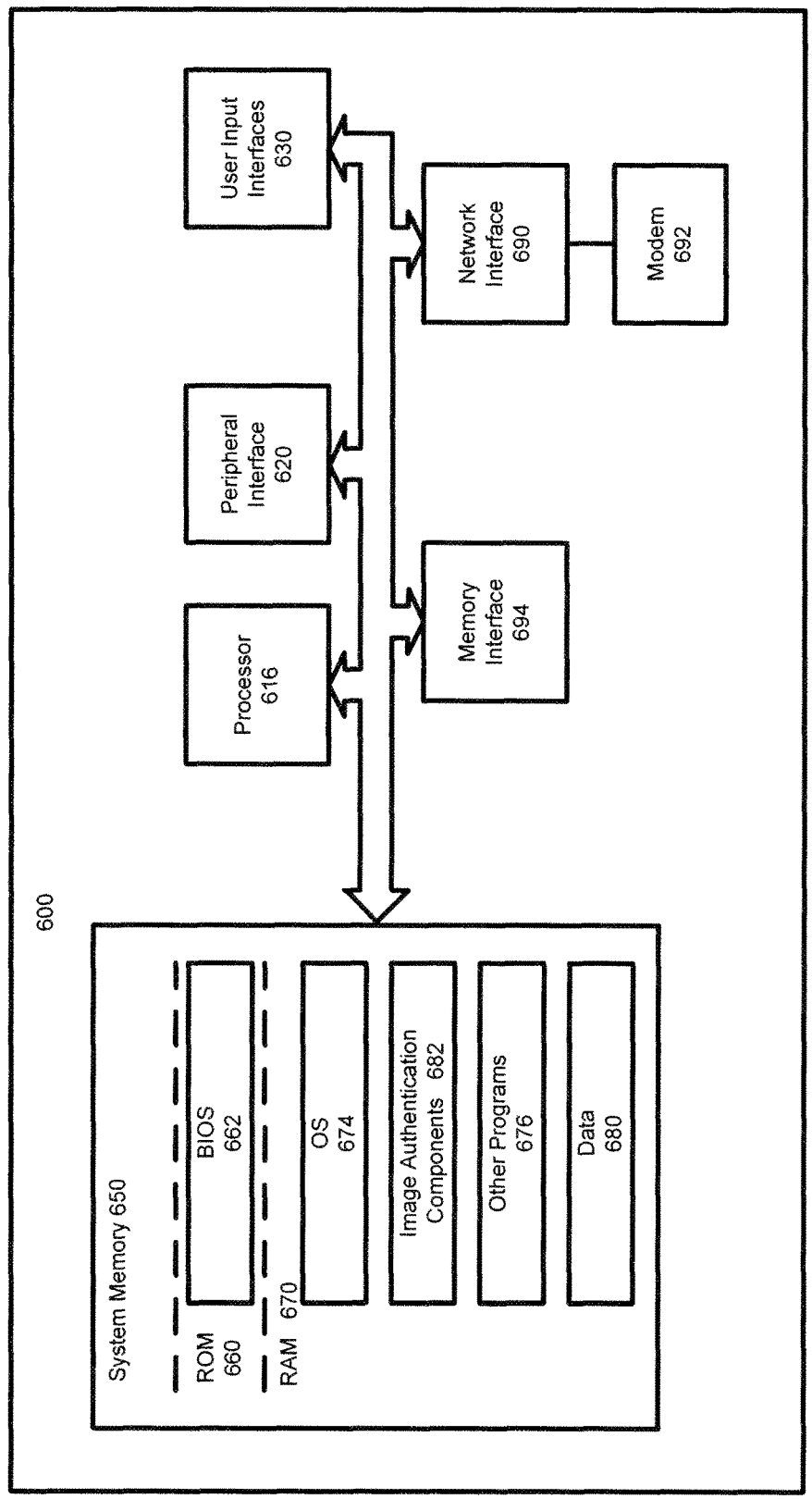
FIG. 6 illustrates an exemplary computing environment in accordance with an embodiment of the invention.

FIG. 6 illustrates an exemplary computing environment in accordance with an embodiment of the invention. All of the components shown in FIGS. 1 through 5 above may be, include, or be implemented by a computer or multiple computers. The components may be described in the general context of computer-executable instructions, such as program modules, being executed by a computer. Generally, program modules include routines, programs, objects, components, data structures, etc. that perform particular tasks or implement particular abstract data types.

FIG. 6 is a block diagram illustrating a computing system 600 implementing authentication system applications that may be utilized in accordance with an embodiment of the invention. This configuration is merely exemplary and should not be construed as limiting. It is likely that multiple computing systems or devices will be utilized to implement the method and system in accordance with embodiments of the invention. The computing system 600 may include a processing unit 610, a peripheral interface 620, a user input interface 630, a system bus 640, a system memory 650, a network interface 690, a connected modem, transceiver, adaptor, or other communication device 692, and a memory interface 694. The system bus 640 may be provided for coupling the various system components.

Computers typically include a variety of computer readable media that can form part of the system memory and be read by the processing unit. By way of example, and not limitation, computer readable media may comprise computer storage media and communication media. The system memory 650 may include computer storage media in the form of volatile and/or nonvolatile memory such as read only memory (ROM) 660 and random access memory (RAM) 670.

A basic input/output system (BIOS) 662, containing the basic routines that help to transfer information between elements, such as during start-up, is typically stored in ROM 660. RAM 670 typically contains data and/or program modules that are immediately accessible to and/or presently being operated on by processing unit. The data or program modules may include an operating system 674, authentication components 682, other program modules 676, and program data 680. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory 650 includes at least one set of instructions that is either permanently or temporarily stored. The processor 610 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The authentication system components 682 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer. Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. In embodiments of the invention, Ab Initio™ software is implemented and structured query language (SQL) is implemented for coding.

Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 610 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 630 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface 620. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention. These networks may include any of those described above with reference to FIG. 1. Although many other internal components of the computer are not shown, those of ordinary skill in the art will appreciate that such components and the interconnections are well known. Accordingly, additional details concerning the internal construction of the computer need not be disclosed in connection with the present invention.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Although the aforementioned components are shown as discrete modules, each of the modules may alternatively be integrated with one another. If the modules are discrete, multiple modules may operate cooperatively as will be further explained below.

Figure 7:
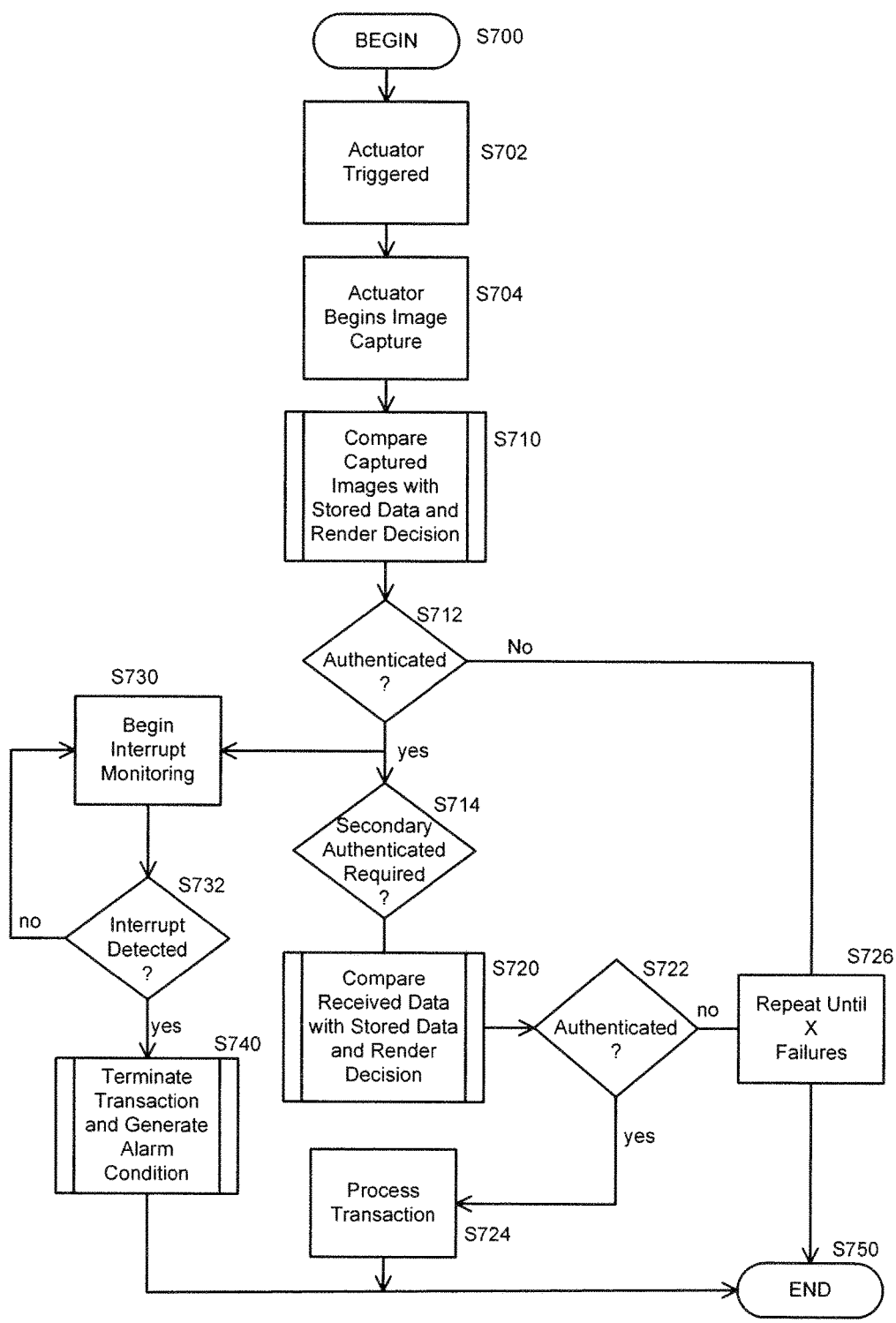
FIG. 7 is a flow chart illustrating an image authentication method in accordance with an embodiment of the invention.

FIG. 7 is a flow chart illustrating an image authentication method in accordance with an embodiment of the invention. The method begins in S700 and the actuator is triggered in response to customer action with respect to the electronic device in S702. As set forth above, in embodiments of the invention, the customer may open a banking application on a remote electronic device in order to actuate image authentication. Alternatively, inserting an ATM card in an ATM may be used to actuate image authentication. Other actuation methods may also be implemented.

In S704, the actuator causes the image capturing device to begin image capture. As explained above, the remote electronic device may have a front facing camera that captures an image of the customer engaging in a financial transaction. When engaged in a transaction at an ATM, the customer may also be facing a camera operating in conjunction with the ATM.

In S710, the system compares captured images with stored data retrieved from the authentication database. This comparison may be carried out using the above-described components using any of a number of appropriate algorithms.

In S712, based on the comparison, the system determines if the customer is authenticated. If the customer is not authenticated in S712, the system may repeat the intake and comparison procedure for a predetermined number of failures before terminating the procedure if desired.

If the customer is authenticated in S712, the system begins interrupt monitoring in S730. With respect to interrupt monitoring, if an interrupt is detected in S732, the transaction may terminated and an alarm condition is generated in S740 if an interrupt condition is detected in S732. Alternatively, the system may default to require additional security questions or other type of authentication. The interrupt monitoring may begin prior to authentication and continue during the transaction and after the transaction is completed. In embodiments of the invention, the interrupt monitoring may continue until a new transaction is initiated.

Further, if the customer is authenticated in S712, the system determines in S714 if secondary authentication is required. If secondary authentication is required in S714, the system compares received data with stored data in S720. If the customer is authenticated in S720, the transaction is processed in S724. If the customer is not authenticated in S722, the system may optionally repeat the authentication process for a predetermined number of failures in S726 before terminating the transaction. The process ends in S750.

Figure 8:
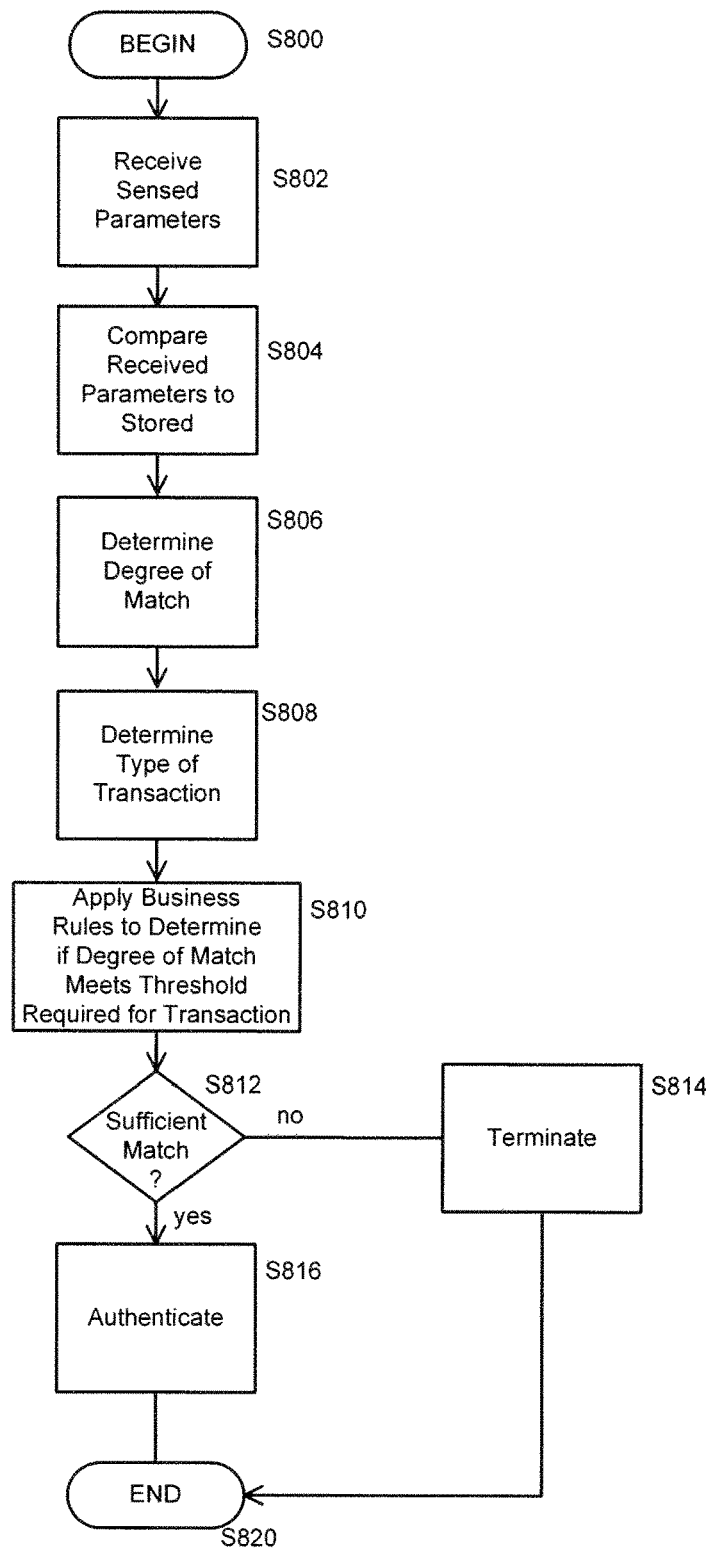
FIG. 8 is a flow chart illustrating a secondary authentication method in accordance with an embodiment of the invention.

FIG. 8 is a flow chart illustrating a secondary authentication method in accordance with an embodiment of the invention. The method begins in S800 and the electronic device receives sensed parameters in S802. As set forth above, the sensors provided may be equipped to sense parameters such as motion, temperature, pulse, etc. or to record fingerprints, voice prints, a retinal image, or other identifying characteristics.

In S804, the system compares received parameters to stored parameters. In S806, the system evaluates the degree of matching. The degree of matching may be evaluated by various methods that depend upon the sensed parameters.

In embodiments of the invention, in S808, the system determines a type of transaction requested. In S810, the system may apply business rules to determine if the degree of match meets a threshold required for the transaction. If a sufficient match is found in S812, the customer may be authenticated in S816. If a sufficient match is not found in S812, the process may terminate in S814. As set forth above, the degree of correspondence required may depend upon the nature of the transaction. If the transaction involves a large amount of money, a higher degree of correspondence may be required for authentication. Withdrawals of cash may require an even higher degree of correspondence. The identity of the customer may have further bearing on the degree of correspondence required. These factors may be considered individually or in any one of various combinations. While this aspect of authentication is described herein with respect to FIG. 8, it may also be implemented for the primary authentication described in connection with FIG. 7. Furthermore, the level of risk of the transaction may be used to determine whether secondary authentication is necessary. In embodiments of the invention, using an ATM card and PIN may be the primary authentication method, and the level of risk of the transaction will determine whether facial recognition is necessary as a secondary authentication mode. Alternatively, for example with an iPhone™ banking transaction, facial recognition may be the primary mode of authentication, and the level of risk of the transaction will determine whether the user needs to answer security questions. The process ends in S820.

In operation, the applications available on the electronic devices may also allow capture and display of the image of another customer involved in a transaction. For example, if the transaction is a transfer from a first customer to a second customer, the image of the first customer may be transferred to the electronic device of the second customer and vice versa. Furthermore, although the techniques described above are in conjunction with conducting a transaction, the techniques may also be utilized upon account opening to verify the identity of the individual opening the account. This may be accomplished through accessing an external database maintained by an information broker or other entity.

Embodiments of the invention may include passive or active operation. With particular reference to embodiments in which facial recognition is, in itself, a secondary authentication method, passive recognition is likely to be implement. For example, the customer may specifically interact with an ATM by providing a card and PIN for authentication, but simultaneously will be passively authenticated through facial recognition. Alternatively, in an active mode, the system may, for example, ask the customer to select a transaction and in response may request that the customer face the camera during authentication proceedings. Either passive or active recognition may be implemented with or without other alternative authentication methods.

Thus, the invention described above solves numerous problems related to account fraud including situations involving the user behavior of paying less attention to the ATM or electronic device once a single transaction is completed. In one case, a user might wish to have another transaction (by pressing a button presented by the ATM), but is immediately distracted (e.g., a phone rings and the user drifts away from the machine), leaving the ATM vulnerable for a potential mis-use. Advantages of embodiments of the invention described herein are significant, as the electronic device is able to determine that (1) a user has stepped away, thus requiring re-authentication upon return, or (2) a different face is recognized, thus requiring a re-authentication.

While the invention is described with particular application to ATMs and portable electronic devices, embodiments of the invention may be implemented with other POS devices used to engage in payment transactions. The POS devices may include, for example, gas pump payment machines and grocery checkout machines. As with ATMs, the system may ask a customer who has completed a transaction whether the customer would like another transaction or may continue to monitor the customer with a camera and may determine that the customer is still present in front of the machine and is attempting another transaction, thus obviating the need to interrogate the customer. Further, the system may also determine whether an interruption has occurred and terminate the session if such interruption has occurred.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations.

What is claimed is:

1. A method for authenticating a customer for performing a financial transaction on an electronic device, the method implemented by one or more bank processing computing devices and comprising:

obtaining, via one or more communication networks, a video image of a face of a customer engaging in a transaction, the video image captured using an image capturing device integrated with a mobile electronic device;

using a sensor to capture at least one from among retinal data and fingerprint data that relates to the customer;

retrieving one or more stored retinal data or stored fingerprints and one or more stored facial patterns related to the customer from an authentication database;

extracting the captured at least one from among the retinal data and the fingerprint data and one or more facial patterns from the captured video image;

generating a score based on a degree of correspondence between the stored retinal data or stored fingerprints and a degree of correspondence between the stored facial patterns and the extracted facial patterns;

determining a transaction type of the transaction, a required score for the transaction type, and when the generated score exceeds the required score for the transaction type; and authenticating the customer and providing an approval for the transaction to the mobile electronic device via the one or more communication networks, when the determining indicates that the generated score exceeds the required score for the transaction type.

2. The method of claim 1, further comprising monitoring the captured video image for an interruption after the transaction is complete and terminating authentication upon an interruption.

3. The method of claim 2, wherein monitoring the transaction for an interruption comprises detecting an interruption upon detection of absence of the captured video image.

4. The method of claim 1, further comprising performing a secondary authentication by capturing a biometric parameter and comparing the captured biometric parameter with a stored biometric parameter.

5. The method of claim 1, further comprising sensing movement of the mobile electronic device in order to actuate image capture.

6. A non-transitory computer readable medium having instructions stored thereon for authenticating a customer for performing a financial transaction on an electronic device comprising executable code that, when executed by one or more processors, causes the one or more processors to:

obtain, via one or more communication networks, a video image of a face of a customer engaging in a transaction, the video image captured using an image capturing device integrated with a mobile electronic device;

use a sensor to capture at least one from among retinal data and fingerprint data that relates to the customer;

retrieve one or more stored retinal data or stored fingerprints and one or more stored facial patterns related to the customer from an authentication database;

extract the captured at least one from among the retinal data and the fingerprint data and one or more facial patterns from the captured video image;

generate a score based on a degree of correspondence between the stored retinal data or stored fingerprints and a degree of correspondence between the stored facial patterns and the extracted facial patterns;

determine a transaction type of the transaction, a required score for the transaction type, and when the generated score exceeds the required score for the transaction type; and authenticate the customer and providing an approval for the transaction to the mobile electronic device via the one or more communication networks, when the determining indicates that the generated score exceeds the required score for the transaction type.

7. The non-transitory computer readable medium of claim 6, wherein the executable code, when executed by the one or more processor, further causes the one or more processors to monitor the captured video image for an interruption after the transaction is complete and terminate authentication upon an interruption.

8. The non-transitory computer readable medium of claim 7, wherein the executable code, when executed by the one or more processor, further causes the one or more processors to detect an interruption upon detection of absence of the captured video image.

9. The non-transitory computer readable medium of claim 6, wherein the executable code, when executed by the one or more processor, further causes the one or more processors to perform a secondary authentication by capturing a biometric parameter and compare the captured biometric parameter with a stored biometric parameter.

10. The non-transitory computer readable medium of claim 6, wherein the executable code, when executed by the one or more processor, further causes the one or more processors to sense movement of the mobile electronic device in order to actuate the capture of the video image.

11. A bank processing computing device comprising memory comprising programmed instructions stored thereon and one or more processors coupled to the memory and configured to executed the stored programmed instructions to:

obtain, via one or more communication networks, a video image of a face of a customer engaging in a transaction, the video image captured using an image capturing device integrated with a mobile electronic device;

use a sensor to capture at least one from among retinal data and fingerprint data that relates to the customer;

retrieve one or more stored retinal data or stored fingerprints and one or more stored facial patterns related to the customer from an authentication database;

extract the captured at least one from among the retinal data and the fingerprint data and one or more facial patterns from the captured video image;

generate a score based on a degree of correspondence between the stored retinal data or stored fingerprints and a degree of correspondence between the stored facial patterns and the extracted facial patterns;

determine a transaction type of the transaction, a required score for the transaction type, and when the generated score exceeds the required score for the transaction type; and authenticate the customer and providing an approval for the transaction to the mobile electronic device via the one or more communication networks, when the determining indicates that the generated score exceeds the required score for the transaction type.

12. The bank processing computing device of claim 11, wherein the one or more processors are further configured to executed the stored programmed instructions to monitor the captured video image for an interruption after the transaction is complete and terminate authentication upon an interruption.

13. The bank processing computing device of claim 12, wherein the one or more processors are further configured to executed the stored programmed instructions to detect an interruption upon detection of absence of the captured video image.

14. The bank processing computing device of claim 11, wherein the one or more processors are further configured to executed the stored programmed instructions to perform a secondary authentication by capturing a biometric parameter and compare the captured biometric parameter with a stored biometric parameter.

15. The bank processing computing device of claim 11, wherein the one or more processors are further configured to executed the stored programmed instructions to sense movement of the mobile electronic device in order to actuate the capture of the video image.

* * * * *